(12) United States Patent
Ahn et al.

(10) Patent No.: US 10,523,812 B2
(45) Date of Patent: Dec. 31, 2019

(54) METHOD AND SYSTEM FOR PROVIDING RINGBACK TONE SERVICE AND RINGTONE SERVICE IN VOICE OVER INTERNET PROTOCOL (VOIP) CALL SERVICE

(71) Applicant: LINE Corporation, Shinjuku-ku, Tokyo (JP)

(72) Inventors: Deok Yong Ahn, Seongnam-si (KR); Sanghyuk Suh, Seongnam-si (KR); Keum Ryong Kim, Seongnam-si (KR); Tae Jeong Lee, Seongnam-si (KR); Jaehyun Lee, Seongnam-si (KR); Min Jeong Kim, Seongnam-si (KR); Hee Nam Byun, Seongnam-si (KR); Jeongrok Kim, Seongnam-si (KR); Hwan Kim, Seongnam-si (KR); Seung Wook Choi, Seongnam-si (KR)

(73) Assignee: Line Corporation, Tokyo (JP)

( * ) Notice: Subject to any disclaimer, the term of this patent is extended or adjusted under 35 U.S.C. 154(b) by 0 days.

(21) Appl. No.: 15/595,047

(22) Filed: May 15, 2017

(65) Prior Publication Data

US 2017/0331948 A1    Nov. 16, 2017

(30) Foreign Application Priority Data

May 13, 2016    (KR) .................. 10-2016-0058725

(51) Int. Cl.
*H04M 3/42* (2006.01)
*H04M 3/436* (2006.01)
(Continued)

(52) U.S. Cl.
CPC .... *H04M 3/42017* (2013.01); *H04L 65/1096* (2013.01); *H04M 3/42051* (2013.01);
(Continued)

(58) Field of Classification Search
CPC ..................... H04M 3/42017; H04M 3/42178
See application file for complete search history.

(56) References Cited

U.S. PATENT DOCUMENTS

| 8,369,507 B2 * | 2/2013 | Radziewicz ...... H04M 3/42017 379/201.02 |
| 8,774,385 B2 * | 7/2014 | Siddiqui .......... H04M 3/42017 379/207.16 |

(Continued)

FOREIGN PATENT DOCUMENTS

| KR | 10-2005-0082802 A | 8/2005 |
| KR | 10-2009-0126733 A | 12/2009 |
| WO | WO-2015/065001 A1 | 5/2015 |

OTHER PUBLICATIONS

Jik Lee, Method for Using Kakao Talk Free-Phone Call Service 'Voice Talk', Jun. 5, 2012, 4 pgs., BetaNews Co., Ltd., http://www.betanews.net/print/562441.

(Continued)

*Primary Examiner* — Nafiz E Hoque
(74) *Attorney, Agent, or Firm* — Harness, Dickey & Pierce, P.L.C.

(57) ABSTRACT

Provided is a method, a system, an apparatus, and/or a non-transitory computer readable medium for providing a ringback tone and a ringtone using a Voice over Internet Protocol (VoIP) call service. A call method may provide sound sources directly edited by users as a ringtone or a ringback tone in a VoIP call service.

20 Claims, 11 Drawing Sheets

(51) Int. Cl.
*H04M 7/12* (2006.01)
*H04L 29/06* (2006.01)
*H04M 7/00* (2006.01)

(52) U.S. Cl.
CPC ....... *H04M 3/42068* (2013.01); *H04M 3/436* (2013.01); *H04M 7/129* (2013.01); *H04M 7/006* (2013.01)

(56) References Cited

U.S. PATENT DOCUMENTS

| | | | |
|---|---|---|---|
| 8,953,769 B2* | 2/2015 | Jacobson | H04M 15/00 379/207.16 |
| 2004/0114732 A1* | 6/2004 | Choe | H04M 3/02 379/88.17 |
| 2007/0294177 A1* | 12/2007 | Volk | G06Q 30/06 705/52 |
| 2009/0185669 A1* | 7/2009 | Zitnik | H04M 3/02 379/217.01 |
| 2012/0155623 A1* | 6/2012 | Haley | H04M 3/42017 379/93.02 |
| 2013/0260893 A1 | 10/2013 | Shin et al. | |
| 2013/0332543 A1 | 12/2013 | Shin et al. | |
| 2014/0019540 A1 | 1/2014 | Shin et al. | |

OTHER PUBLICATIONS

Korean Office Action for Korean Patent Application No. 10-2016-0058725 dated Feb. 28, 2017.

\* cited by examiner

METHOD AND SYSTEM FOR PROVIDING RINGBACK TONE SERVICE AND RINGTONE SERVICE IN VOICE OVER INTERNET PROTOCOL (VOIP) CALL SERVICE

CROSS-REFERENCE TO RELATED APPLICATION(S)

This U.S. non-provisional application claims the benefit of priority under 35 U.S.C. § 119 to Korean Patent Application No. 10-2016-0058725, filed on May 13, 2016, in the Korean Intellectual Property Office (KIPO), the entire contents of which are incorporated herein by reference.

BACKGROUND

Field

One or more example embodiments relate to methods, systems, apparatuses, and/or non-transitory computer readable media for providing a ringback tone and a ringtone using a Voice over Internet Protocol (VoIP) call service.

Description of Related Art

A coloring service refers to an additional communication service that allows a subscriber to change a ringing tone (e.g., ringtone and/or ringback tone, etc.) of a monotonous machine sound with desired music and/or various sounds. In general, users may use the coloring service by selecting, subscribing to, purchasing, etc., a desired sound source among sound sources edited and provided from a service provider (e.g., a telecommunications company, etc.), business operators, etc., and by setting the purchased sound source to a call service. For example, a sound source set as a coloring service by a user A is provided as a ringback tone to callers that call the user A. Inversely, the callers may set their desired music as a ringback tone that is played when the user A calls the caller. For example, the conventional art may consist of technology in which a VoIP application server plays back music designated by a caller as a ringback tone in response to a call connection request from the caller in conjunction with a media server.

However, such related arts may simply allow a user to select a desired sound source from among sound sources provided by a business operator and may use the selected sound source as a ringtone or a ringback tone, however, the user may not use a variety of sound sources.

SUMMARY

One or more example embodiments provide a call method and a call system that may provide sound sources directly edited by users as a ringtone and/or a ringback tone in a Voice over Internet Protocol (VoIP) call service.

One or more example embodiments also provide a call method and a call service that may provide sound sources directly edited by users as a ringtone and/or a ringback tone by playing back a sound source stored on a terminal as a ringtone or stopping playback of the sound source in response to a reply from a VoIP server, or by playing back a sound source stored on a web as a ringback tone in a streaming manner or stopping playback of the sound source.

According to an aspect of at least one example embodiment, there is provided a non-transitory computer-readable recording medium storing computer readable instructions that, when executed by at least one processor, causes the at least one processor to perform a call method, the call method including selecting a callee in response to an input of a caller; transmitting a request to an application (app) server for address information of a ringback tone stream that is managed on a web server in association with an account related to the selected callee; receiving the address information from the app server; transmitting a request to a Voice over Internet Protocol (VoIP) server for a call setup for a VoIP call with the callee; receiving the ringback tone stream using the address information in response to a reply from the VoIP server; and playing back the received ringback tone stream as a ringback tone for the VoIP call.

According to an aspect of at least one example embodiment, there is provided a call method of an electronic device configured as a computer, the method including selecting, using at least one processor, a callee in response to an input of a caller; transmitting, using the at least one processor, a request to an application (app) server for address information of a ringback tone stream that is managed on a web server in association with an account related to the selected callee; receiving, using the at least one processor, the address information from the app server; transmitting, using the at least one processor, a request to a Voice over Internet Protocol (VoIP) server for a call setup for a VoIP call with the callee; receiving, using the at least one processor, the ringback tone stream using the address information in response to a reply from the VoIP server; and playing back the received ringback tone stream as a ringback tone for the VoIP call.

According to an aspect of at least one example embodiment, there is provided a call method of an app server configured as a computer, the method including receiving, using at least one processor, a request for address information of a ringback tone stream that is managed on a web server in association with an account of a callee from an electronic device of a caller; transmitting, using the at least one processor, a request to a streaming server for the address information based on the account of the callee; receiving, using the at least one processor, the address information of the ringback tone stream associated with the account of the callee from the streaming server; and transmitting, using the at least one processor, the received address information to the electronic device of the caller.

According to some example embodiments, it is possible to provide sound sources directly edited by users as a ringtone and/or a ringback tone for use in a VoIP call service.

Also, according to some example embodiments, it is possible to provide sound sources directly edited by users as a ringtone and/or a ringback tone by playing back a sound source stored on a terminal as a ringtone or stopping playback of the sound source in response to a reply from a VoIP server, or by playing back a sound source stored on a web as a ringback tone in a streaming manner or stopping playback of the sound source.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
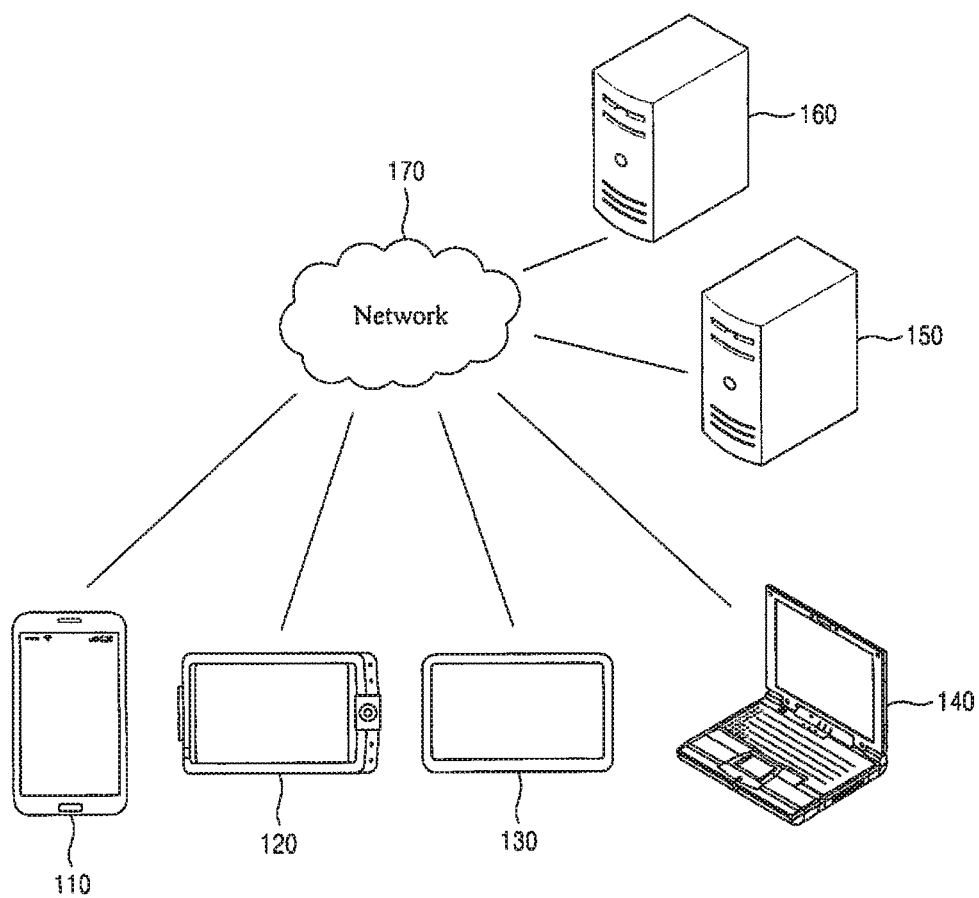
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, and/or a combination of hardware and software. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment.

Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a personal navigation device, a computer, a laptop computer, a digital broadcasting terminal, a personal digital assistant (PDA), a portable multimedia player (PMP), a tablet personal computer, a gaming console, a virtual reality device, an augmented reality device, an Internet of Things (IoT) device, and the like. For example, although the electronic device 110 is provided in a form of a smartphone, it is provided as an example only. According to at least one example embodiment, the electronic device 110 may indicate various types of devices capable of communicating with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus, or a plurality of computer apparatuses, that provides instructions, codes, files, contents, services, and the like through communication with the plurality of electronic devices 110, 120, 130, and/or 140 over the network 170. For example, the server 150 may be a system that provides a first service to the plurality of electronic devices 110, 120, 130, and/or 140 connected through the network 170, and the server 160 may also be a system that provides a second service to the plurality of electronic devices 110, 120, 130, and/or 140 connected through the network 170. For example, the first service may be a messenger service that routes transmission and reception of an instant message and the second service may be a Voice over Internet Protocol (VoIP) call service, but the example embodiments are not limited thereto.

Figure 2:
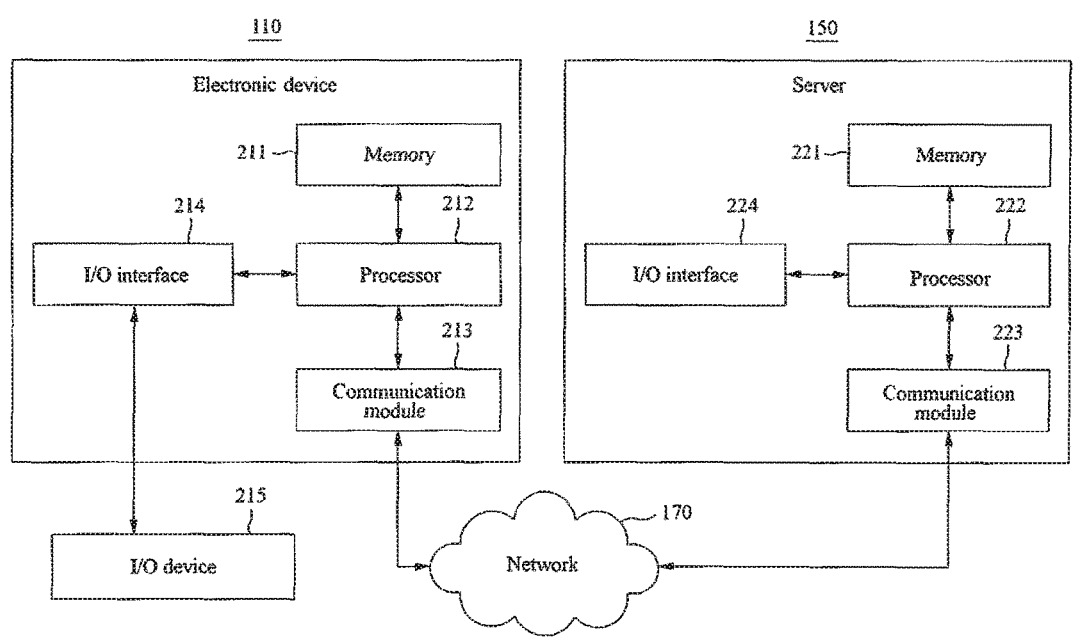
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server, but the example embodiments are not limited thereto and the electronic device 110 and/or the server 150 may include a greater or less number of constituent components. The same or similar configuration as that of the electronic device 110 or the server 150 may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, and the server 150 may include a memory 221, at least one processor 222, a communication module 223, and an I/O interface 224. The memory 211, 221 may include a permanent mass storage device, such as random access memory (RAM), read only memory (ROM), a disk drive, etc., as a non-transitory computer-readable storage medium. Here, ROM and the permanent mass storage device may be included as a permanent storage device separate from the memory 211, 221. Also, an OS and at least one program code, for example, software code for a browser installed and executed on the electronic device 110 or an application installed on the electronic device 110 for providing a specific service, etc., may be stored on the memory 211, 221. Such software constituent elements may be loaded from another non-transitory computer-readable storage medium separate from the memory 211, 221 using a drive mechanism. The other non-transitory computer-readable storage medium may include, for example, a floppy drive, a disk, a tape, a Blu-ray/DVD/CD-ROM drive, a memory card, etc. According to other example embodiments, software constituent elements may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored on the storage device, such as the memory 211, 222, thereby transforming the processor 212, 222 into a special-purpose processor.

The communication module 213, 223 may provide a function for communication between the electronic device 110 and the server 150 over the network 170, and may provide a function for communication with one or more additional electronic devices, for example, the electronic device 120, or one or more additional servers, for example, the server 160. For example, the processor 212 of the electronic device 110 may transfer a request, for example, a request for a video call service, created based on a program code stored on the storage device such as the memory 211, to the server 150 over the network 170 under the control of the communication module 213. Additionally, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored on a storage medium further includable in the electronic device 110.

The I/O interface 214, 224 may be a device used for interface with an I/O device 215. For example, an input device may include a keyboard, a mouse, a camera, a microphone, a touch panel, etc., and an output device may include a display device, such as a display for displaying a communication session of an application, a speaker, a haptic feedback device, etc. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. For example, the electronic device 110 may include at least a portion of the I/O device 215, and/or may further include other constituent elements, for example, a transceiver, a global positioning system (GPS) module, a camera, a variety of sensors, a database, and the like. In detail, if the electronic device 110 is a smartphone, the electronic device 110 may be configured to further include a variety of constituent elements, for example, an accelerometer sensor, a gyro sensor, a camera, various physical buttons, a button using a touch panel, an I/O port, a motor for vibration feedback, etc., which are generally included in the smartphone.

Figure 3:
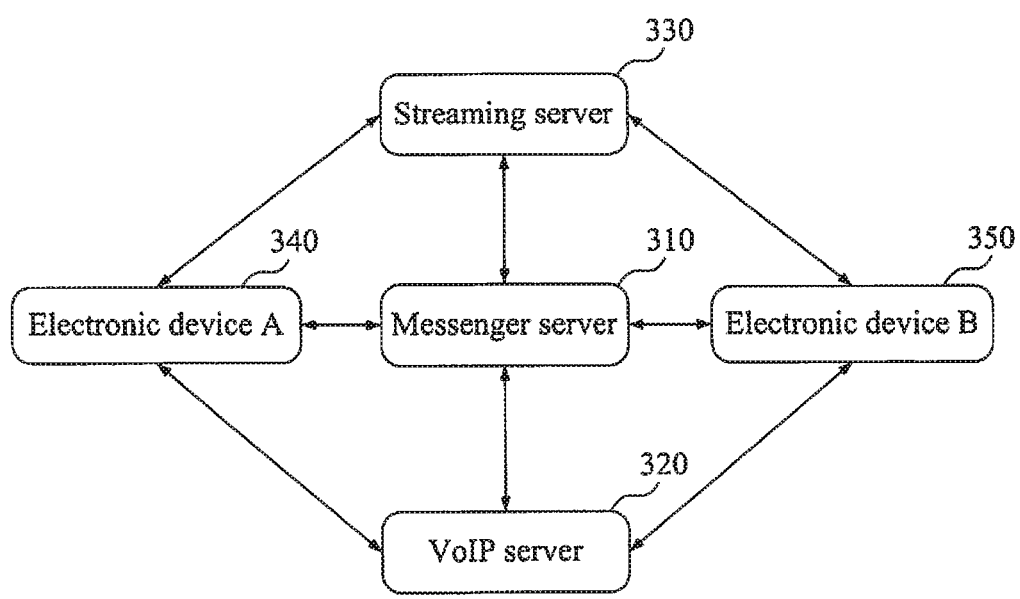
FIG. 3 illustrates an example of an entire system for a Voice over Internet Protocol (VoIP) call service according to at least one example embodiment.

FIG. 3 illustrates an example of a system for a Voice over Internet Protocol (VoIP) call service according to at least one example embodiment. FIG. 3 illustrates a messenger server 310, a VoIP server 320, a streaming server 330, an electronic device A 340, and an electronic device B 350, but the example embodiments are not limited thereto and the VoIP system may include a greater or lesser amount of constituent elements. Here, the messenger server 310, the VoIP server 320, and the streaming server 330 may be configured as the server 150, and the electronic device A 340 and the electronic device B 350 may be configured as the electronic device 110.

The messenger server 310 may be a system to provide a messaging service based on an identified relationship (and/or personal relationship) between users. For example, a messenger application for the messaging service may be installed and executed on a plurality of electronic devices, e.g., the electronic device A 340 and the electronic device B 350. Also, the messenger server 310 may set up a conversation session between an account of a user A of the electronic device A 340 and an account of a user B of the electronic device B 350. Once the user A inputs and/or selects data, for example, a text, an image, a link, a file, etc., through the messenger application executed on the electronic device A 340, an instant message including the input and/or selected data may be transmitted to the messenger server 310. Here, the messenger server 310 may route the instant message so that the received instant message may be transferred to the electronic device B 350 through the corresponding conversation session. Additionally, an instant message transmitted from the electronic device B 350 may be transferred to the electronic device A 340 through the messenger server 310. Accordingly, the messenger server 310 may provide a messaging service to enable a conversation as a conversation session between the electronic device A 340 and the electronic device B 350, but the example embodiments are not limited thereto and there may be an unlimited number of participants and/or participating electronic devices included in the conversation session.

Also, the messenger server 310 may provide a VoIP call service to a plurality of electronic devices, such as the electronic device A 340 and the electronic device B 350, in conjunction with the VoIP server 320. For example, the messenger application executed on the electronic device A 340 and the electronic device B 350 may include a user interface for VoIP call. In response to a request from the user A of the electronic device A 340 for origination of a VoIP call using the provided user interface, the VoIP server 320 may provide the VoIP call service by processing a call setup between the electronic device A 340 and the electronic device B 350.

Here, the messenger application installed and executed on the electronic device A 340 and the electronic device B 350 may control the electronic device A 340 and the electronic device B 350 to play back a ringtone (e.g., an audio file that is played by a callee's electronic device when an incoming call is received that is audible to the callee) and/or a ringback tone (e.g., an audio file that is played by a caller's electronic device when the caller transmits a call to the callee's electronic device) in response to a reply provided from the VoIP server 320 to the electronic device A 340 and the electronic device B 350. For example, a ringback tone stream may be an audio stream that is set to the electronic device A 340 and may be stored on the streaming server 330. In this example, in response to a request from the electronic device B 350 for the origination of a VoIP call, the ringback tone stream may be transmitted from the streaming server 330 to the electronic device B 350 and may be played back in a streaming manner through a media player executed on the electronic device B 350.

Substantial data transmission and reception may be performed through the network 170.

Hereinafter, examples of a method of providing a ringtone and a ringback tone are described according to some example embodiments.

Figure 4:
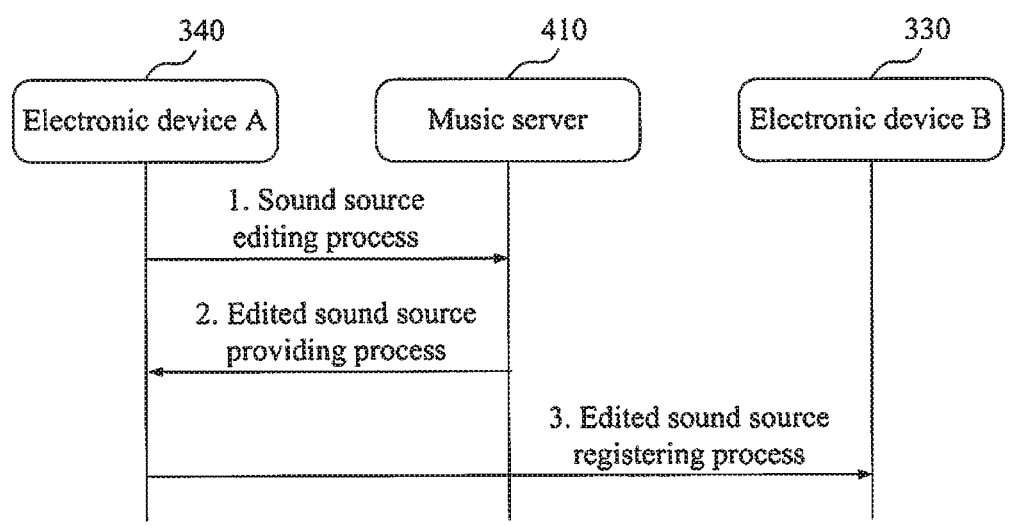
FIG. 4 illustrates an example of a process of registering a ringback tone stream according to at least one example embodiment.

FIG. 4 illustrates an example of a process of registering a ringback tone stream according to at least one example embodiment. Hereinafter, an example of creating and registering a ringback tone stream using a music server 410 connected to the messenger server 310 is described with reference to FIG. 4.

1. Sound source editing process may be an example of a process in which the user A connects to the music server 410 using the electronic device A 340 and creates a desired ringback tone using a sound source editing function provided by the music server 410. For example, a music application may be installed on the electronic device A 340, and the electronic device A 340 may connect to the music server 410 under the control of the music application and the electronic device A 340 may create a ringback tone through a process of selecting a desired section from a sound source (e.g., a sound source that includes a plurality of sounds, audio files, music files, etc.) using the sound source editing function provided from the music server 410. The aforementioned messenger application may provide a function for setting a ringtone or a ringback tone for a VoIP call. Through this function, the messenger application and the music application may interact.

2. Edited sound source providing process may be an example of a process in which the music server 410 transmits the edited sound source to the electronic device A 340. For example, the music server 410 may transmit, to the electronic device A 340, the sound source edited using the sound source editing function in a desired file format.

As another example, the sound source editing function may be provided from the music application. In detail, the user A may connect to the music application through a messenger application executed on the electronic device A 340, may download a desired sound source through the music server 410, and may edit the downloaded sound source using the sound source editing function provided from the music application.

3. Edited sound source registering process may be an example of a process in which the electronic device A 340 registers the edited sound source received from the music server 410 to the streaming server 330 as a ringback tone and/or ringtone. For example, the messenger application may control the electronic device A 340 to provide a ringback tone setting function to the user A, and may control the electronic device A 340 to connect to the music server 410 in conjunction with the music application through the ringback tone setting function and to be provided with the sound source editing function. Also, the messenger application may include a function for controlling the electronic device A 340 to register and/or automatically register the edited sound source provided from the music server 410 to the streaming server 330 as the ringback tone and/or ringtone.

The edited sound source may be stored on the electronic device A 340 to be used as a ringtone. Also, although FIG. 4 illustrates an example of editing a sound source to be used as a ringtone and/or a ringback tone through the separate music server 410, it is provided as an example only. A sound source directly created by the user A, for example, a sound source recorded by the user A, a sound source edited by the user A, a sound source synthesized by the user A, a sound source created by the user A, a sound source downloaded from the Internet, and the like, may be used as a ringtone and/or a ringback tone.

Figure 5:
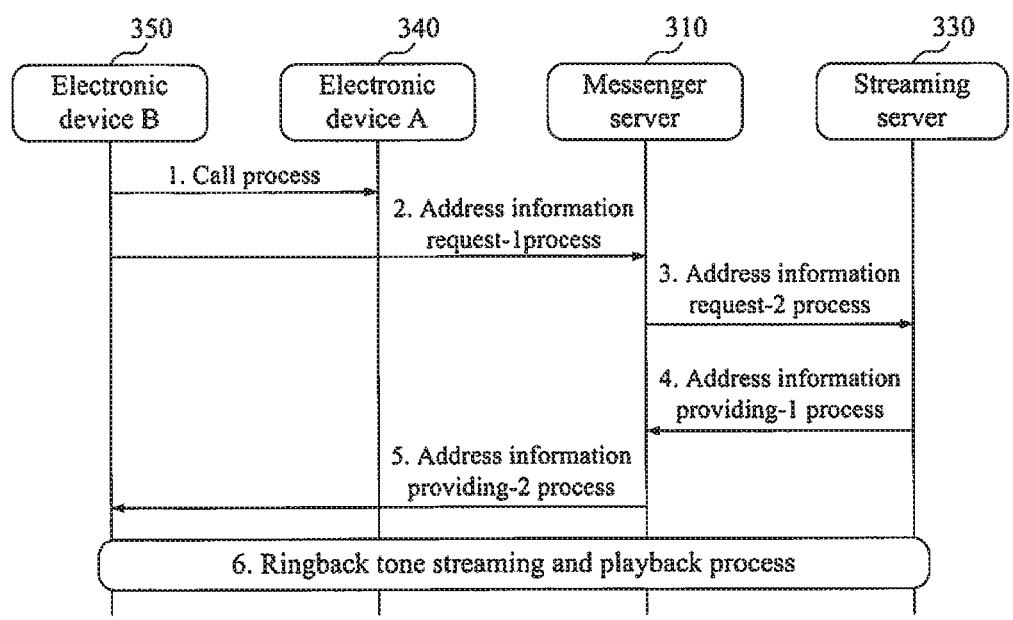
FIG. 5 illustrates an example of a process of playing back a registered ringback tone stream according to at least one example embodiment.

FIG. 5 illustrates an example of a process of playing back a registered ringback tone stream according to at least one example embodiment. Hereinafter, an example of a process of playing back a ringback tone in response to a call request from the electronic device B 350 to the electronic device A 340 is described with reference to FIG. 5.

1. Call process may be an example of a process in which the electronic device B 350 requests a call with the electronic device A 340 (e.g., the electronic device B 350 places a call to the electronic device A 340). In reality, the electronic device B 350 requests the electronic device A 340 for the call through the aforementioned VoIP server 320, which is omitted in FIG. 5.

2. Address information request-1 process may be an example of a process in which the electronic device B 350 requests the messenger server 310 for address information associated with a ringback tone stream, for example, a streaming uniform resource locator (URL) of a ringback tone stream, and IP address associated with the ringback tone stream, a filepath locator of the ringback tone stream, etc.

3. Address information request-2 process may be an example of a process in which the messenger server 310 transfers the request from the electronic device B 350 to the streaming server 330.

4. Address information providing-1 process may be an example of a process in which the streaming server 330 provides the requested address information to the messenger server 310.

5. Address information providing-2 process may be an example of a process in which the messenger server 310 transfers, to the electronic device B 350, the address information received from the streaming server 330.

6. Ringback tone streaming and playback process may be an example of a process in which the electronic device B 350 receives the ringback tone stream from the streaming server 330 using the address information of the ringback tone stream and plays back the ringback tone stream in a streaming manner.

That is, in FIG. 5, the edited sound source that is registered by the electronic device A 340 to the streaming server 330 may be played back at the electronic device B 350 as a ringback tone. Here, the electronic device B 350 may play back the ringback tone stream provided from the streaming server 330 in a streaming manner through a media player installed and executed on the electronic device B 350. For example, the media player may be an audio playback program, a phone call dialer program, a VoIP dialer program, a videoconference program, an instant messaging program, etc.

Playback of the ringback tone and the stopping of playback of the ringback tone may be performed in response to a reply received by the electronic device B 350 from the VoIP server 320 under the control of a messenger application installed on the electronic device B 350. Hereinafter, a process of playing back a ringback tone and a ringtone and stopping payback of the ringback tone and the ringtone is further described.

Figure 6:
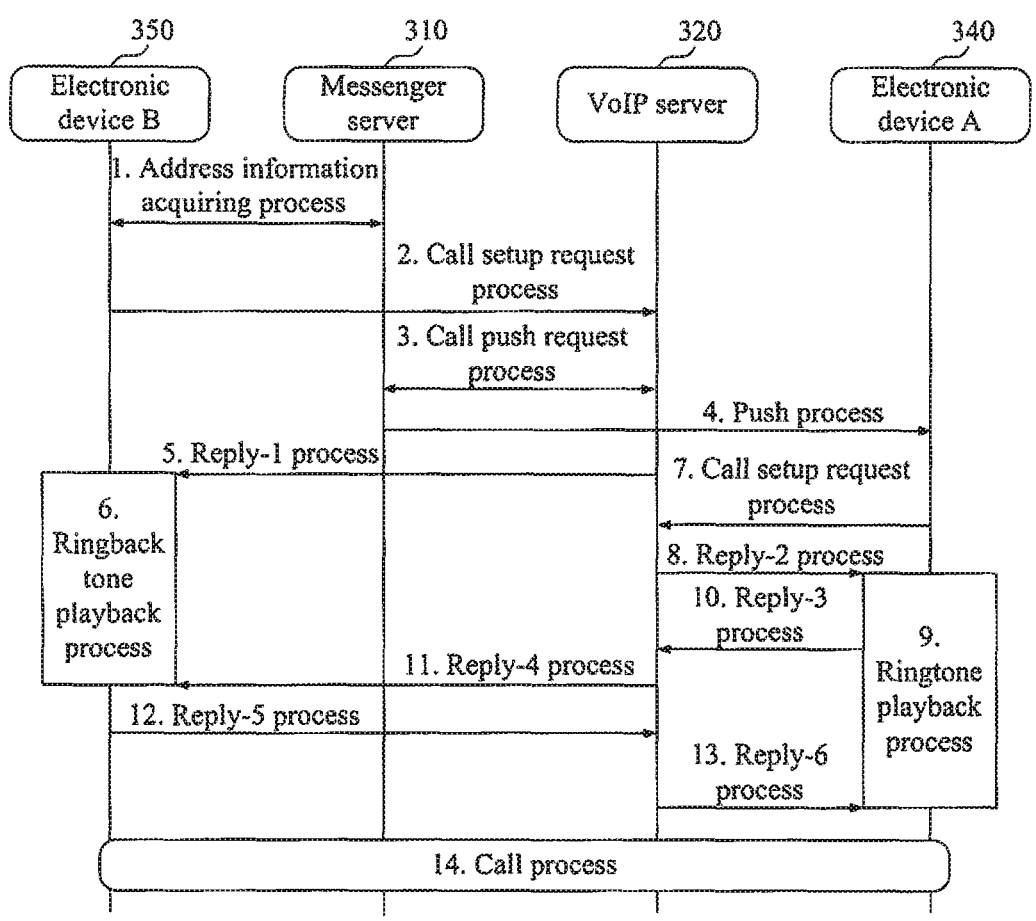
FIG. 6 illustrates an example of a process of playing back a ringtone and a ringback tone and stopping playback of the ringtone and the ringback tone in response to a reply from a VoIP server according to at least one example embodiment.

FIG. 6 illustrates an example of a process of playing back a ringtone and/or a ringback tone and stopping playback of the ringtone and/or the ringback tone in response to a reply from a VoIP server according to at least one example embodiment.

1. Address information acquiring process may be an example of a process in which the electronic device B 350 acquires address information for a ringback tone stream (and/or the ringtone) through the messenger server 310. For example, the electronic device B 350 may request the messenger server 310 for address information using an account of the user A of the electronic device A 340 with which the electronic device B 350 desires to perform a VoIP call, and the messenger server 310 may receive address information of a ringback tone stream associated with the account of the user A and may provide the address information to the electronic device B 350. Here, the account of the user A may be user identification information used to identify users at the messenger server 310.

2. Call setup request process may be an example of a process in which the electronic device B 350 requests the VoIP server 320 for a call setup with the electronic device A 340.

3. Call push request process may be an example of a process in which the VoIP server 320 requests the messenger server 310 to push a call request.

4. Push process may be an example of a process in which the messenger server 310 pushes the call request to the electronic device A 340 and notifies the electronic device A 340 about a presence of the call request.

5. Reply-1 process may be an example of a process in which the VoIP server 320 transmits, to the electronic device B 350, a reply to the notification from the presence of the call request with the electronic device A 340 through the messenger server 310.

6. Ringback tone playback process may be an example of a process in which the electronic device B 350 receives and plays back the ringback tone stream in a streaming manner based on the acquired address information in response to the reply from the VoIP server 320. For example, the messenger application executed on the electronic device B 350 may control the electronic device B 350 to execute the media player installed on the electronic device B 350 in response to the reply from the VoIP server 320 and to receive and play back the ringback tone stream based on the address information.

7. Call setup request process may be an example of a process in which the electronic device A 340 requests (e.g., transmits a request to) the VoIP server 320 for a call setup. For example, the messenger application executed on the electronic device A 340 may control the electronic device A 340 to request the VoIP server 320 for the call setup in response to push from the messenger server 310.

8. Reply-2 process may be an example of a process in which the VoIP server 320 transmits a reply to the call setup request to the electronic device A 340.

9. Ringtone playback process may be an example of a process in which the electronic device A 340 plays back a ringtone in response to the reply from the VoIP server 320. For example, the messenger application executed on the electronic device A 340 may control the electronic device A 340 to execute a media player installed on the electronic device A 340 in response to the reply from the VoIP server 320 and to play back a ringtone stored on the electronic device A 340.

10. Reply-3 process may be an example of a process in which the electronic device A 340 transmits, to the VoIP server 320, a reply indicating that a call is ready (e.g., that the call connection has been established between the electronic device A 340 and the electronic device B 350).

11. Reply-4 process may be an example in which the VoIP server 320 transfers the reply from the electronic device A 340 to the electronic device B 350. Here, the electronic device B 350 may stop playback of the ringback tone in response to the transferred reply.

12. Reply-5 process may be an example of a process in which the electronic device B 350 transmits the reply to the VoIP server 320.

13. Reply-6 process may be an example of a process in which the VoIP server 320 transfers the reply transmitted from the electronic device B 350 to the electronic device A 340. Here, the electronic device A 340 may stop playback of the ringtone in response to the transferred reply.

14. Call process may be an example of a process in which the VoIP call is enabled between the electronic device B 350 corresponding to a caller side and the electronic device A 340 corresponding to a callee side.

Figure 7:
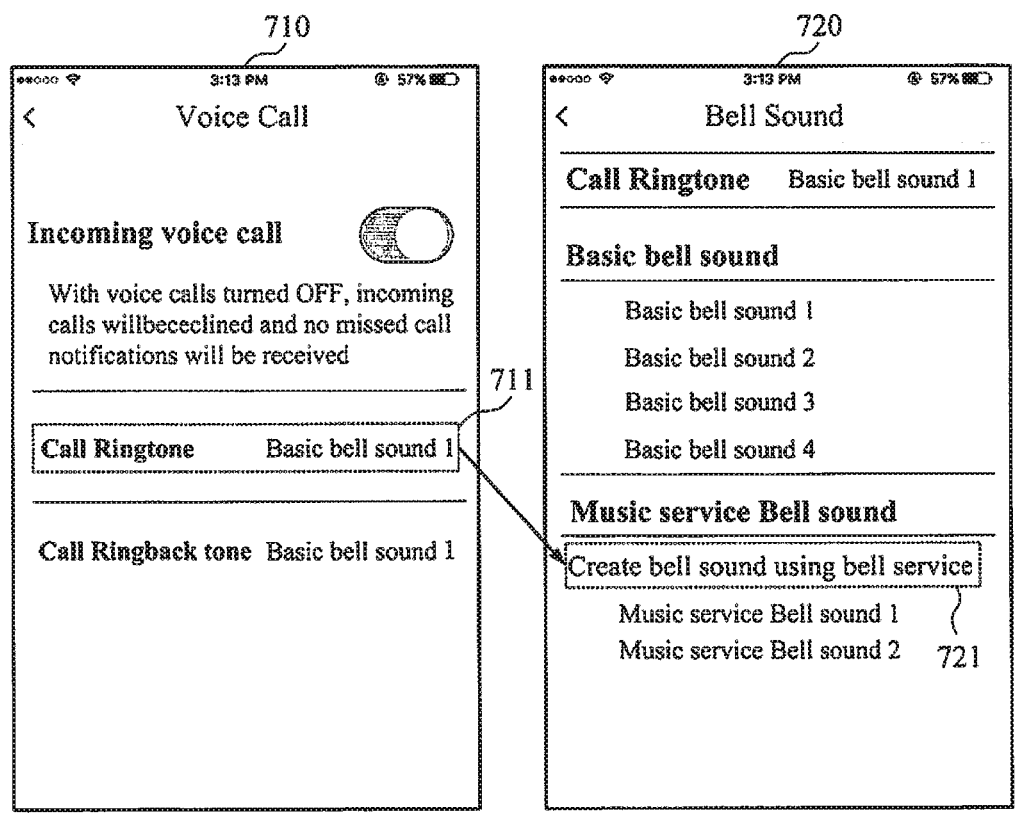
FIG. 7 illustrates an example of a user interface for setting a ringtone according to at least one example embodiment.

FIG. 7 illustrates an example of a user interface for setting a ringtone according to at least one example embodiment. A first screen 710, as an example of a setting screen associated with a VoIP call provided from a messenger application, shows an example in which a ringtone and a ringback tone for call are set as a basic bell sound 1, however the example embodiments are not limited thereto and the ringtone and the ringback tone may be separate tones and/or sounds that are independently selected. Referring to FIG. 7, in response to a user selection on a ringtone related area as shown in a first box 711 indicated with dotted lines, for example, in response to a user touch on an area of the first box 711 in a touch screen environment, a second screen 720 for managing the ringtone may be provided. The user may select a desired sound from a plurality of selectable sounds, such as a basic bell sound from among a plurality of basic bell sounds, provided from a messenger application, and/or may create the desired sound source as a ringtone sound (e.g., a bell sound) through a music service (and/or an MP3 file, an audio CD, any other audio file, etc.) and use the created sound source. For example, in response to a user selection on an area of a second box 721 indicated with dotted lines, a music application associated with the music service may be executed on an electronic device under control of the messenger application. The electronic device may connect to the music server 410 of FIG. 4 under control of the music application. Here, the user may create a desired sound source through a sound source editing function provided from the music server 410 or a music editing function provided from the music application for the music streaming service. The created sound source may be provided to the electronic device and may be stored on the electronic device and may be used as the ringtone. As described above, the sound source editing function may be provided online through a music service server or may be provided on a local through the music application.

In a similar manner, the user may select a desired sound, e.g., a basic bell sound from among basic bell sounds, and used as a ringback tone. For example, in response to a user selection on the basic bell sound 1, a sound source of the basic bell sound 1 may be registered to the streaming server 330 as the ringback tone. Also, the user may create the desired sound source through the music service and may register the created sound source to the streaming server 330 as the ringback tone.

Figure 8:
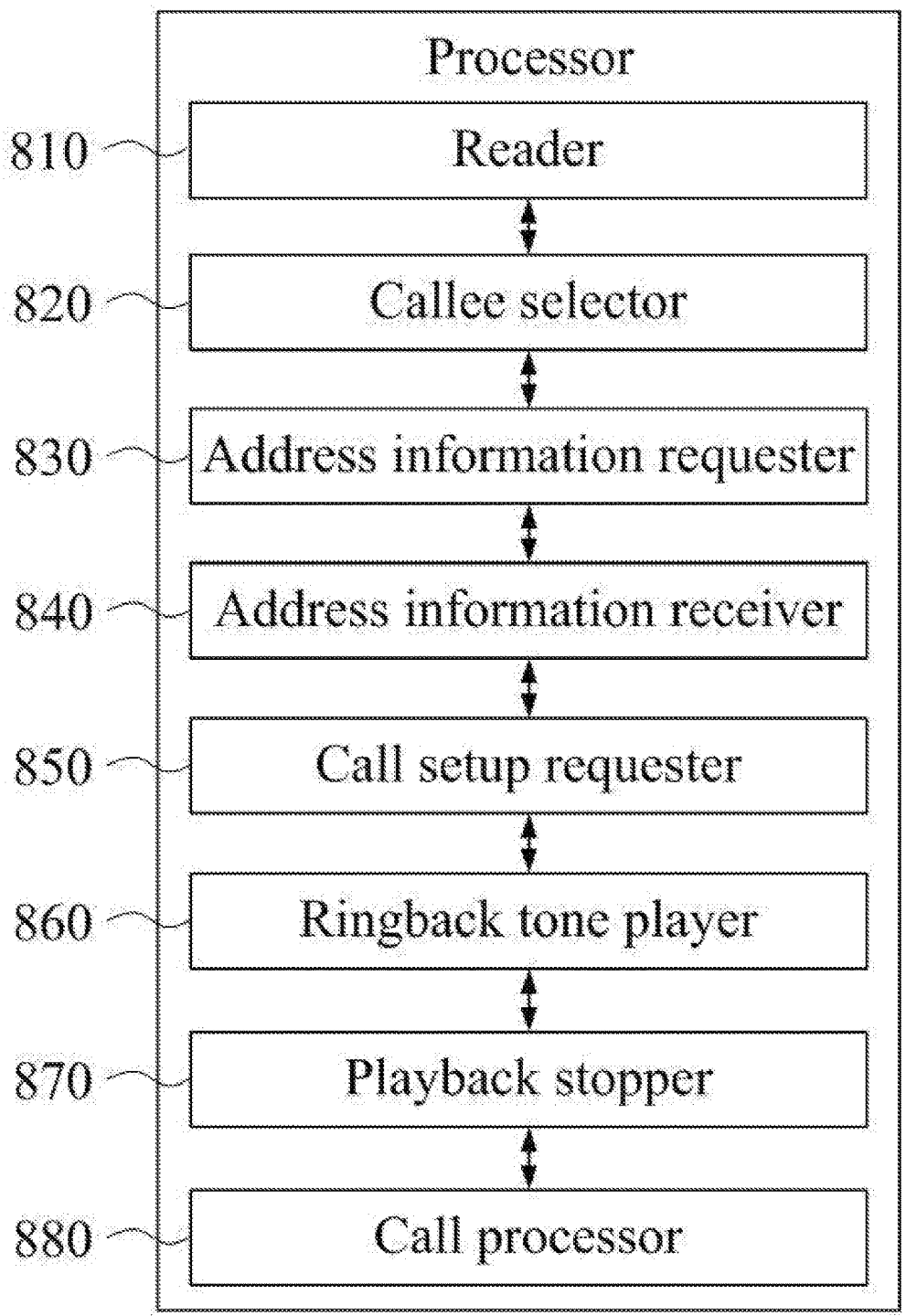
FIG. 8 is a block diagram illustrating an example of components includable in a processor of an electronic device according to at least one example embodiment.
Figure 9:
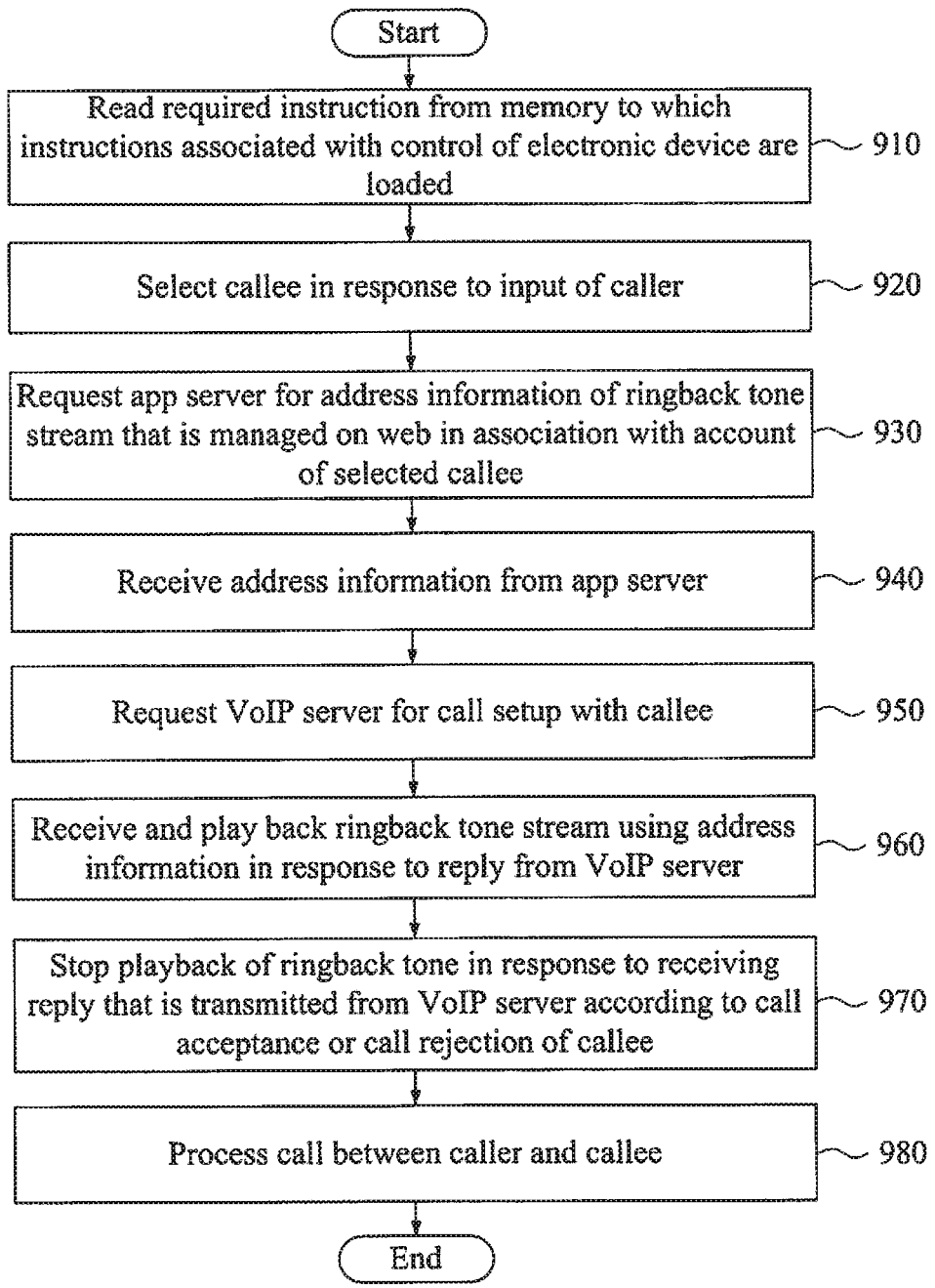
FIG. 9 is a flowchart illustrating an example of a method performed by an electronic device according to at least one example embodiment.

FIG. 8 is a block diagram illustrating an example of components includable in at least one processor of an electronic device according to at least one example embodiment, and FIG. 9 is a flowchart illustrating an example of a method performed by an electronic device according to at least one example embodiment.

Referring to FIG. 8, the at least one processor 212 may be included in the electronic device 110, and may include, as components, a reader 810, a callee selector 820, an address information requester 830, an address information receiver 840, a call setup requester 850, a ringback tone player 860, a playback stopper 870, and/or a call processor 880, but is not limited thereto.

The processor 212 and the components of the processor 212 may control the electronic device 110 to perform operations 910 through 980 included in a call method of FIG. 9. The processor 212 and the components of the processor 212 may be configured to execute instructions corresponding to code, for example, code for a messenger application, of at least one program and code of the OS included in the memory 211. Here, the components of the processor 212 may be representations of different functions of the processor 211 performed by the processor 212 in response to a control instruction provided from code stored on the electronic device 110 and/or hardware components of the processor 212 included in the processor 212. For example, the reader 810 may be used as a functional representation of the processor 212 that controls the electronic device 110 to read an instruction loaded to the memory 211 in response to the control instruction.

In operation 910, the reader 810 may read a required instruction from the memory 211 to which computer readable instructions associated with control of the electronic device 110 are loaded. In this case, the read instruction may include an instruction for controlling the processor 212 to perform the following operations 920 through 980.

In operation 920, the callee selector 820 may select a callee in response to an input of a caller. For example, the callee selector 820 may control the electronic device 110 to display a list of users selectable as the callee on a display of the electronic device 110, and may verify, as the callee, another user that is selected by the caller corresponding to a user of the electronic device 110 from the list. In detail, the electronic device 110 may receive a messaging service based on a relationship and/or personal relationship between users through a messenger server, for example, the server 150 or the messenger server 310. For example, the relationship between users of the messenger application may be a list of friends and/or other personal contacts having set a personal relationship with the caller may be provided from the messenger server to the electronic device 110, and the callee selector 820 may provide a list of friends and/or other personal contacts to the caller so that the caller may select the callee from the list of friends. As another example, in response to the caller selecting a user interface for a VoIP call on a chatroom provided to the caller, the callee selector 820 may select a participant of the chatroom as the callee. As described above, the callee selector 820 may select, as the callee, a friend and/or other contact that is selected from among friends and/or contacts of the caller having set the personal relationship with the caller in response to the input of the caller, based on the messaging service provided from the messenger server.

In operation 930, the address information requester 830 may request an app server for address information of a ringback tone stream that is managed on a web (e.g., a server) in association with an account of the selected callee. Here, the app server may correspond to the messenger server, and the account of the callee may correspond to user identification information used to identify users at the app server. The messenger server may set up a communication session between an account of the caller and the account of the callee and may process transmission and reception of an instant message between the caller and the callee through the communication session. Once the user selects the callee for the VoIP call, the address information requester 830 may transmit a message requesting address information of the ringback tone stream to the app server with the account of the selected callee. As described above, the ringback tone stream may be uploaded and registered to a streaming server, for example, the streaming server 330 of FIG. 3, through an electronic device of the callee and may be managed in association with the account of the callee. The app server may acquire address information of the ringback tone stream from the streaming server using the account of the callee and may transmit the address information to the electronic device 110. According to at least one example embodiment, the ringback tone stream may be created through a sound source editing function provided from a music service server, for example, the music server 410, configured to provide the music streaming service and to identify the callee through the account to an electronic device, for example, the electronic device 120, of the callee, or through a sound source editing function provided from the music application for the music streaming service, but the example embodiments are not limited thereto. The created ringback tone stream may be provided to the electronic device of the callee and may be uploaded from the electronic device of the callee to the streaming server and may be managed in association with the account of the callee.

In operation 940, the address information receiver 840 may receive the address information from the app server. For example, the address information receiver 840 may control the electronic device 110 to receive the address information of the ringback tone stream that is acquired from the streaming server and transferred from the app server.

In operation 950, the call setup requester 850 may request a VoIP server for a call setup with the callee. For example, the call setup requester 850 may control the electronic device 110 to transmit a message including the call setup request to a VoIP server, for example, the server 160 and/or the VoIP server 320, through the network 170.

In operation 960, the ringback tone player 860 may receive and play back the ringback tone stream using the address information in response to a reply from the VoIP server. For example, the ringback tone player 860 may control the electronic device 110 to receive and play back the ringback tone stream in a streaming manner from the streaming server to which the callee registers the ringback tone stream using the address information. Here, the ringback tone player 860 may execute a media player installed on the electronic device 110 and may play back the received ringback tone stream through the media player. The caller that is the user of the electronic device 110 may listen to the sound source that is created and registered by the callee, as the ringback tone. According to other example embodiments, instead of streaming the ringback tone stream, the electronic device 110 may download the ringback tone stream and associate the ringback tone stream with the callee so that when the caller calls the callee the downloaded ringback tone stream is played.

In operation 970, the playback stopper 870 may stop playback of the ringback tone stream in response to receiving a reply that is transmitted from the VoIP server according to a call acceptance or a call rejection of the callee. For example, the reply indicating that the callee accepts the call or rejects the call according to a protocol of the VoIP call may be transferred to the electronic device 110 through the VoIP server. The playback stopper 870 may control the electronic device 110 to stop the ringback tone stream being played back in a streaming manner through the media player to proceed with or cancel the call in response to the transferred reply.

In operation 980, the call processor 880 may process the call between the caller and the callee. For example, when the callee accepts the call, the call processor 880 may control the electronic device 110 to perform operation 980.

In the meantime, a ringtone may be played back on the electronic device of the callee. For example, in response to a call setup request transmitted from the electronic device 110 to the VoIP server, the VoIP server may push a call request to the electronic device of the callee through the messenger server. According to at least one example embodiment, the electronic device of the callee may request the VoIP server for the call setup and the electronic device of the callee may play back a desired and/or pre-stored ringtone in response to the reply from the VoIP server. For example, the messenger application executed on the electronic device of the callee may control the electronic device of the callee to play back the desired and/or pre-stored ringtone through the media player executed on the electronic device of the callee, in response to receiving the reply from the VoIP server.

The messenger application may play back the ringtone and/or the ringback tone using the media player based on the reply that is transmitted from the VoIP server according to an existing protocol. Thus, various sound sources created by users may be conveniently used as the ringtone and/or the ringback tone.

Figure 10:
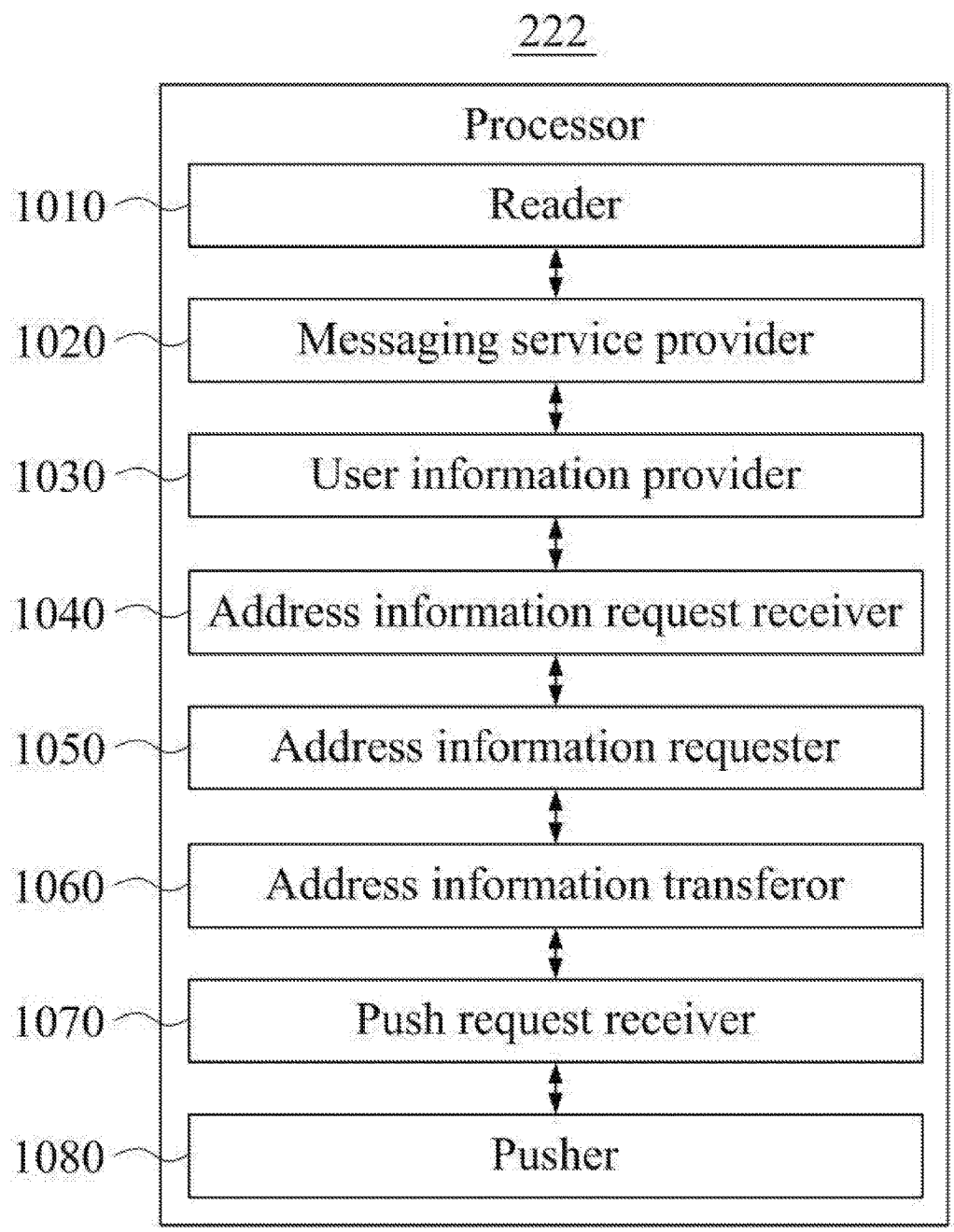
FIG. 10 is a block diagram illustrating an example of components includable in a processor of an app server according to at least one example embodiment.
Figure 11:
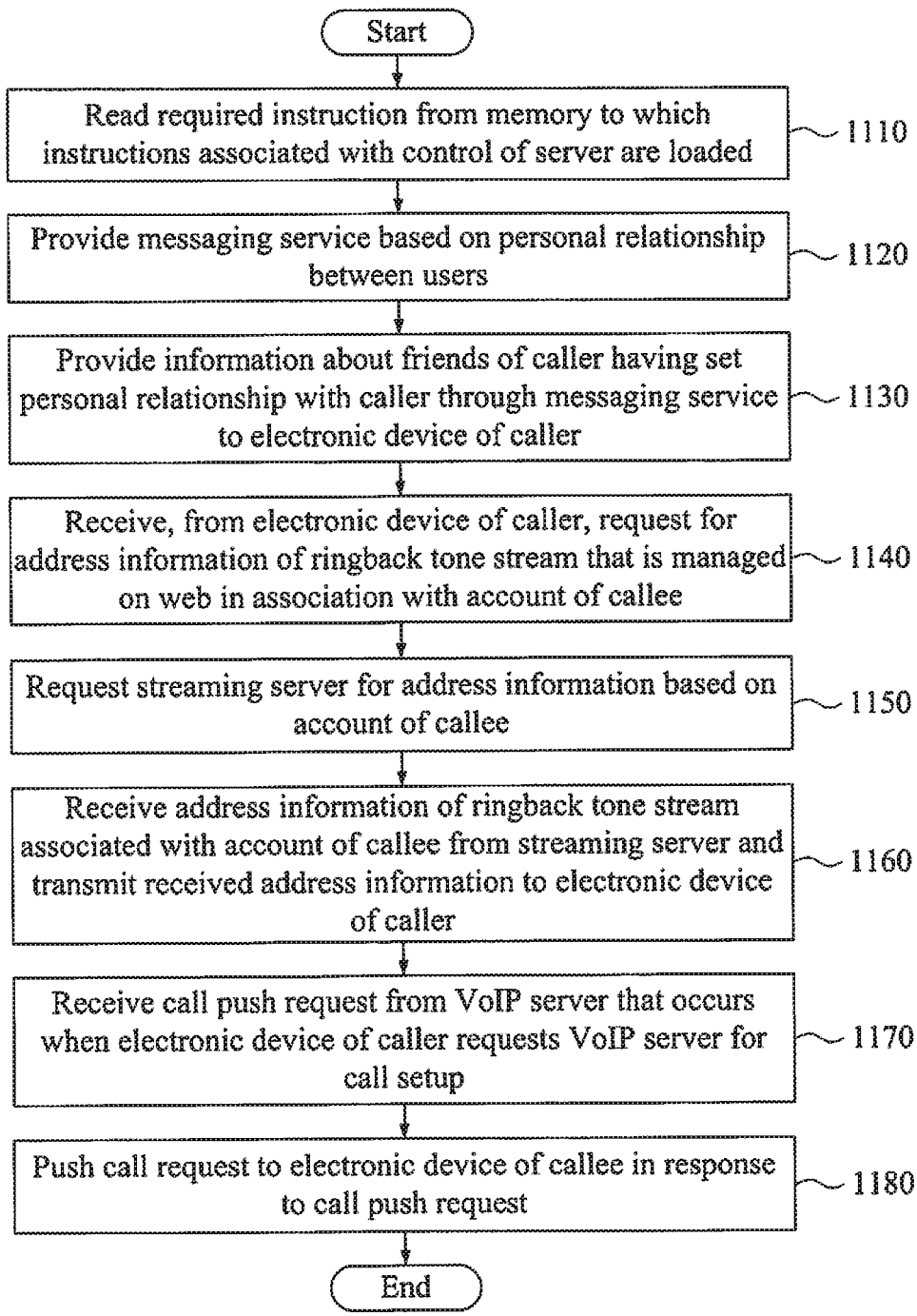
FIG. 11 is a flowchart illustrating an example of a method performed by an app server according to at least one example embodiment.

FIG. 10 is a block diagram illustrating an example of components includable in at least one processor of an app server according to at least one example embodiment, and FIG. 11 is a flowchart illustrating an example of a method performed by an app server according to at least one example embodiment.

Referring to FIG. 10, the at least one processor 222 may be included in the server 150, and may include, as components, a reader 1010, a messaging service provider 1020, a user information provider 1030, an address information request receiver 1040, an address information requester 1050, an address information transferor 1060, a push request receiver 1070, and/or a pusher 1080. Herein, although the server 150 is configured as a messenger server, it is provided as an example only. The server 150 may be configured as a service server that provides a different type of social network service.

The processor 222 and the components of the processor 222 may control the server 150 to perform operations 1110 through 1180 included in a call method of FIG. 11. Here, the processor 222 and the components of the processor 222 may be configured to execute instructions corresponding to code of at least one program and code of the OS included in the memory 221. Here, the components of the processor 222 may be representations of different functions of the processor 222 performed by the processor 222 in response to a control instruction provided from the code stored on the server 150 and/or hardware components of the processor 222 included in the processor 222. For example, the reader 1010 may be used as a functional representation of the processor 222 that controls the server 150 to read an instruction loaded to the memory 221 in response to the control instruction.

In operation 1110, the reader 1010 may read a desired and/or required computer readable instruction from the memory 221 to which instructions associated with control of the server 150 are loaded. In this case, the read instruction may include an instruction for controlling the processor 222 to perform operations 1120 through 1180.

In operation 1120, the messaging service provider 1020 may provide a messaging service based on a relationship and/or personal relationship between users. For example, the messaging service provider 1020 may control the server 150 to route an instant message between users having set a communication session. Herein, a description is made based on an example in which the server 150 is the messenger server. However, the server 150 may be configured as a server to provide a different type of social network service, such as a photo sharing service, a social posting service, an online gaming service, a location-based service, etc. In this case, in operation 1120, the social network service may be provided based on the personal relationship between users. Here, a service provided from the server 150 may be provided to users through an application installed on electronic devices of users of the social network service.

In operation 1130, the user information provider 1030 may provide information about friends of a caller having set a relationship and/or personal relationship with the caller through the messaging service to an electronic device, for example, the electronic device 110, of the caller. For example, the user information provider 1030 may control the server 150 to provide a list of friends and/or contacts to the caller.

In operation 1140, the address information request receiver 1040 may receive, from the electronic device of the caller, a request for address information of a ringback tone stream that is managed on a web (e.g., a server) in association with an account of the callee. For example, when the caller attempts to make a VoIP call with the callee, the request for address information may be transmitted to the server 150 through a messenger application installed on the electronic device of the caller. Here, the address information request receiver 1040 may control the server 150 to receive the request transmitted from the electronic device of the caller.

In operation 1150, the address information requester 1050 may request the streaming server for the address information based on the account of the callee. As described above, a sound source created and/or edited by the callee may be registered to the streaming server in association with the account of the callee as the ringback tone stream. Here, the address information requester 1050 may control the server 150 to transmit a message including the request for address information to the streaming server with the account of the callee.

In operation 1160, the address information transferor 1060 may receive address information of the ringback tone stream associated with the account of the callee from the streaming server and may transmit the received address information to the electronic device of the caller. For example, once the streaming server transmits address information in response to the request of operation 1150, the address information transferor 1060 may control the server 150 to receive the address information and to transmit the received address information to the electronic device of the caller.

In operation 1170, the push request receiver 1070 may receive a call push request from a VoIP server that occurs when the electronic device of the caller requests the VoIP server for the call setup. For example, when the electronic device of the caller requests the VoIP server for the call setup with the callee, the VoIP server may transmit a message including the call push request to the server 150. Here, the push request receiver 1070 may control the server 150 to receive the corresponding message.

In operation 1180, the pusher 1080 may push (e.g., transmit) the call request to the electronic device of the callee in response to the call push request. For example, the message transmitted from the VoIP server may include information about the account of the callee. The server 150 may identify the callee based on the account of the callee and may push the call request to the electronic device of the callee. The pushed information may be recognized through the messenger application installed on the electronic device of the callee and the electronic device of the callee may recognize that the call from the caller is being requested. Here, the electronic device of the callee may request the VoIP server for the call setup and may play back a ringtone desired and/or pre-stored on the electronic device of the callee in response to a reply from the VoIP server.

Also, the electronic device of the caller that receives the address information may receive and play back the ringback tone stream, for example, in a streaming manner, etc., based on the address information, in response to the reply that is transmitted from the VoIP server in response to the call setup request.

As described above, the ringtone and/or the ringback tone may be played back through the media player executed on the electronic device under control of the messenger application.

According to some example embodiments, it is possible to provide sound sources directly edited by users as a ringtone and/or a ringback tone in a VoIP call service. In particular, it is possible to provide sound sources directly edited by users as a ringtone and/or a ringback tone by playing back a sound source stored on a terminal as a ringtone or stopping playback of the sound source in response to a reply from a VoIP server, or by playing back a sound source stored on a web as a ringback tone in a streaming manner or stopping playback of the sound source.

The units described herein may be implemented using hardware components or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable recording medium storing computer readable instructions that, when executed by at least one processor of an electronic device, causes the at least one processor to perform a call method, the call method comprising:
   selecting a callee in response to an input of a caller using the electronic device;
   transmitting, by the electronic device, a request to an application (app) server for address information of a ringback tone stream that is managed on a web server in association with an account related to the selected callee;
   receiving, by the electronic device, the address information from the app server in response to the transmitted request;
   transmitting, by the electronic device, a request to a Voice over Internet Protocol (VoIP) server for a call setup for a VoIP call with the callee, the request for the call setup transmitted to the VoIP server after the request for the address information was transmitted to the app server;
   receiving, by the electronic device, the ringback tone stream using the address information in response to receiving a reply from the VoIP server regarding the request for the call setup; and
   playing back the received ringback tone stream as a ringback tone for the VoIP call on the electronic device.

2. The non-transitory computer-readable recording medium of claim 1, wherein
   the app server comprises a messenger server configured to provide a messaging service based on defined relationships between a plurality of users on the messaging service and to identify the plurality of users based on an account associated with each user on the messaging service; and
   the selecting comprises selecting at least one user as the callee from the defined relationships associated with the account of the caller on the messaging service using a messaging service application.

3. The non-transitory computer-readable recording medium of claim 1, wherein
   the ringback tone stream is uploaded to a streaming server associated with the web server through an electronic device of the callee and managed in association with the account of the callee; and
   the address information is acquired by the app server through the streaming server and transmitted from the app server to an electronic device of the caller.

4. The non-transitory computer-readable recording medium of claim 3, wherein
   the ringback tone stream is created through a sound editing function that is provided from a music service server configured to provide a music streaming service and to identify the callee based on the account of the callee, or a sound source editing function that is provided from a music application for the music streaming service, provided to the electronic device of the caller, and uploaded from the electronic device of the callee to the streaming server and managed in association with the account of the callee.

5. The non-transitory computer-readable recording medium of claim 1, wherein
the receiving comprises receiving the ringback tone stream in a streaming manner through a streaming server based on the address information; and
the playing back comprises playing back the received ringback tone stream using a media player installed on an electronic device of the caller.

6. The non-transitory computer-readable recording medium of claim 1, the call method further comprising:
stopping playback of the ringback tone stream in response to receiving a reply that is transmitted from the VoIP server, the reply indicating a call acceptance or a call rejection by the callee of the call setup for the VoIP call; and
controlling an electronic device of the caller to process the VoIP call between the caller and the callee.

7. The non-transitory computer-readable recording medium of claim 1, wherein
the VoIP server is configured to transmit a call push request to the app server in response to the caller-side call setup request from the electronic device;
the app server is configured to push the call request to an electronic device of the callee based on messenger service account information of the callee in response to receiving the call push request from the VoIP server;
the electronic device of the callee is configured to,
transmit a callee-side call setup request to the VoIP server in response to the pushed call request from the app server,
receive a reply to the callee-side call setup request from the VoIP server, and
play back a ringtone stored on the electronic device of the callee in response to the reply to the callee-side call setup request from the VoIP server.

8. The non-transitory computer-readable recording medium of claim 7, wherein
a messenger application executed on the electronic device of the callee is configured to control the electronic device of the callee so that the ringtone stored on the electronic device of the callee is played back through a media player executed on the electronic device of the callee in response to receiving the reply from the VoIP server.

9. A call method of an electronic device configured as a computer, the method comprising:
selecting, using at least one processor of the electronic device, a callee in response to a user input of a caller;
transmitting, using the at least one processor, a request to an application (app) server for address information of a ringback tone stream that is managed on a web server in association with an account related to the selected callee;
receiving, using the at least one processor, the address information from the app server in response to the transmitted request;
transmitting, using the at least one processor, a caller-side request to a Voice over Internet Protocol (VoIP) server for a call setup for a VoIP call with the callee, the caller-side request for the call setup transmitted to the VoIP server after the request for the address information was transmitted to the app server;
receiving, using the at least one processor, the ringback tone stream using the address information in response to receiving a reply from the VoIP server regarding the caller-side request for the call setup; and
playing back, using the at least one processor, the received ringback tone stream as a ringback tone for the VoIP call on the electronic device.

10. The method of claim 9, wherein
the app server comprises a messenger server configured to provide a messaging service based on defined relationships between a plurality of users on the messaging service and to identify the plurality of users based on an account associated with each user on the messaging service; and
the selecting comprises selecting at least one friend user as the callee from the defined relationships associated with the account of the caller on the messaging service using a messaging service application.

11. The method of claim 9, wherein
the ringback tone stream is uploaded to a streaming server associated with the web server through an electronic device associated with the callee and managed in association with the account of the callee; and
the address information is acquired by the app server through the streaming server and transmitted from the app server to an electronic device of the caller.

12. The method of claim 9, wherein
the receiving comprises receiving the ringback tone stream in a streaming manner through a streaming server based on the address information; and
the playing back comprises playing back the received ringback tone stream using a media player installed on the electronic device of the caller.

13. The method of claim 9, further comprising:
stopping playback of the ringback tone stream in response to receiving a reply that is transmitted from the VoIP server, the reply indicating a call acceptance or a call rejection by the callee of the call setup for the VoIP call; and
controlling the electronic device of the caller to process the VoIP call between the caller and the callee.

14. The method of claim 9, wherein
the VoIP server is configured to transmit a call push request to the app server in response to the caller-side call setup request from the electronic device;
the app server is configured to push the call request to an electronic device of the callee based on messenger service account information of the callee in response to receiving the call push request from the VoIP server; and
the electronic device of the callee is configured to,
transmit a callee-side call setup request to the VoIP server in response to the pushed call request from the app server,
receive a reply to the callee-side call setup request from the VoIP server, and
play back a ringtone stored on the electronic device of the callee in response to the reply to the callee-side call setup request from the VoIP server.

15. A call method of an app (application) server configured as a computer, the method comprising:
receiving, using at least one processor of the app server, a request for address information of a ringback tone stream that is managed on a web server in association with an account of a callee from an electronic device of a caller;

transmitting, using the at least one processor, a request to a streaming server for the address information based on the account of the callee in response to the received request for the address information;

receiving, using the at least one processor, the address information of the ringback tone stream associated with the account of the callee from the streaming server; and transmitting, using the at least one processor, the received address information to the electronic device of the caller, wherein the electronic device of the caller is caused to, receive the ringback tone stream using the address information in response to receiving a reply from a Voice over Internet Protocol (VoIP) server regarding a caller-side request transmitted by the electronic device of the caller to the VoIP server for a call setup for a VoIP call with the callee, and play back the received ringback tone stream as a ringback tone for the VoIP call on the electronic device.

16. The method of claim 15, further comprising:

providing, using the at least one processor, a messaging service based on a defined relationship between a plurality of users of the messaging service; and providing, using the at least one processor, the electronic device of the caller with information related to at least one user associated with the caller based on the defined relationships associated with the account of the caller on the messaging service via a messaging service application on the electronic device of the caller, wherein the callee is selected from among the at least one user associated with the caller.

17. The method of claim 15, wherein the ringback tone stream is uploaded to the streaming server through the electronic device of the callee and managed in association with the account of the callee; and the transmitting the request to the streaming server comprises transmitting a request for the address information of the ringback tone stream that is managed in association with the account of the callee.

18. The method of claim 15, further comprising:

receiving, using the at least one processor, a call push request from a Voice over Internet Protocol (VoIP) server in response to a caller-side call setup request transmitted from the electronic device of the caller to the VoIP server; and pushing, using the at least one processor, a call request to an electronic device of the callee based on messenger service account information of the callee in response to the call push request from the VoIP server.

19. The method of claim 18, wherein, in response to a reply from the VoIP server to the call setup request, the ringback tone stream is played back on the electronic device of the caller using the address information.

20. The method of claim 18, wherein the call setup request is transmitted from the electronic device of the callee to the VoIP server in response to the pushing of the call request; and a ringtone stored on the electronic device of the callee is played back in response to a reply from the VoIP server.

* * * * *